(12) United States Patent
Adams et al.

(10) Patent No.: US 7,819,930 B2
(45) Date of Patent: Oct. 26, 2010

(54) MISCIBLE, MULTI-COMPONENT, DIESEL FUELS AND METHODS OF BIO-OIL TRANSFORMATION

(75) Inventors: Thomas Adams, Athens, GA (US); Manuel Garcia, Québec (CA); Dan Geller, Athens, GA (US); John W. Goodrum, Athens, GA (US); Joshua T. Pendergrass, Jefferson, GA (US)

(73) Assignee: University of Georgia Research Foundation, Inc., Athens, GA (US)

( * ) Notice: Subject to any disclaimer, the term of this patent is extended or adjusted under 35 U.S.C. 154(b) by 710 days.

(21) Appl. No.: 11/803,211

(22) Filed: May 14, 2007

(65) Prior Publication Data
US 2007/0261296 A1 Nov. 15, 2007

Related U.S. Application Data

(60) Provisional application No. 60/800,489, filed on May 15, 2006.

(51) Int. Cl.
*C10L 5/00* (2006.01)

(52) U.S. Cl. ............................ 44/605; 44/307; 44/606; 208/14; 208/15

(58) Field of Classification Search ........... 44/307–308, 44/605–606, 349–352; 208/14–15, 17
See application file for complete search history.

(56) References Cited

U.S. PATENT DOCUMENTS 5,578,090 A * 11/1996 Bradin .................. 44/308
5,820,640 A * 10/1998 Ikura et al. .............. 44/301

OTHER PUBLICATIONS

Alencar, J.W. et al (1983). J. Agric. Food Chem., 31, 1268-1270.*
Bridgwater, A.V. (1999). J. Anal. Appl. Pyrolysis, 51, 3-22.*
Mohan, D. et al. (2006). Energy & Fuels, 20, 848-889.*
Czernik, S. et al. (2004), Energy & Fuels, 18, 590-598.*
International Search Report and Written Opinion, May 7, 2008.

* cited by examiner

*Primary Examiner*—Robert J Hill, Jr.
*Assistant Examiner*—Brian McCaig
(74) *Attorney, Agent, or Firm*—Thomas, Kayden, Horstemeyer & Risley, LLP

(57) ABSTRACT

Briefly described, embodiments of this disclosure include methods of recovering bio-oil products, fuels, diesel fuels, and the like are disclosed.

14 Claims, 2 Drawing Sheets

MISCIBLE, MULTI-COMPONENT, DIESEL FUELS AND METHODS OF BIO-OIL TRANSFORMATION

CROSS-REFERENCE TO RELATED APPLICATION

This application claims priority to U.S. provisional application entitled, "BIO-DIESEL FUELS AND METHODS OF BIO-OIL TRANSFORMATION," having Ser. No. 60/800,489, filed on May 15, 2006, which is entirely incorporated herein by reference.

STATEMENT REGARDING FEDERALLY SPONSORED RESEARCH OR DEVELOPMENT

This invention(s) was made with government support awarded by the U.S. Department of Energy to the Georgia Environmental Facilities Authority for the University of Georgia Fuel Cell and Biorefinery Research as well as the Georgia State Program for Traditional Industries Research, TIP3 Fiber Committee and assigned number GEFA GO85012 for DOE Grant. The government has certain rights in the invention(s).

BACKGROUND

Biomass, such as forestry and agricultural products and residues, is a major underutilized product in the world. The U.S. Department of Energy estimated that there are over 12 million dry tons of biomass residues generated each year in Georgia that could be used for energy and chemical production. There are several different technologies for converting the biomass to useful energy (e.g., direct burn, co-firing, gasification, and the like) or to biobased products (e.g., fermentation, pyrolysis, and the like), in particular bio-oil. Depending on the type of process used, the final product may have different values and applications. In most cases these products replace those generated from crude oil, thus having long-term sustainability and environmental benefits (e.g., being carbon neutral).

The use of biomass pyrolysis derived bio-oil as a diesel fuel extender or substitute has long been a goal of the biofuels research community. Bio-oil is a mixture of water, light volatiles, and non-volatiles and is highly reactive because of the presence of significant quantities of oxygen. The diversity of chemical species within bio-oil is derived from the decomposition of cellulose, fatty acids, triglycerides, lignin and hemicellulose polymers, the major components of biomass. Aside from water, a major component of these oils, they also contain over 300 identified compounds including hydroxyaldehydes, hydroxyketones, sugars, carboxylic acids, furans and phenolic compounds. Bio-oil also contains several phases due to the different physical states of the chemical components. The exact chemical makeup of bio-oil is determined by several factors such as feedstock, pyrolysis temperature, pyrolysis method and speed of pyrolysis.

The reactivity of functional groups and high water content of this oil results in its immiscibility with petroleum based diesel fuel. One common method for addressing this issue has been development of emulsions of diesel fuel and bio-oil. However, the high cost of forming and maintaining these emulsions is an obstacle to their economic feasibility. Additionally, these emulsions are limited to 30% bio-oil with petroleum diesel.

SUMMARY

Briefly described, embodiments of this disclosure include methods of recovering bio-oil products, fuels, diesel fuels, and the like are disclosed. One exemplary method of recovering bio-oil products, among others, includes: providing a biomass; heating the biomass to about 350 to 700° C. at about ambient pressure for about 6 seconds to 10 minutes; producing a bio-oil, wherein the bio-oil is selected from a bio-oil vapor stream, condensed bio-oil, and a combination thereof; and mixing the bio-oil with a biodiesel fuel to form a bio-oil/biodiesel fuel mixture.

One exemplary fuel, among others, includes: a bio-oil/Biodiesel fuel mixture from the method described above.

One exemplary diesel fuel, among others, includes: a miscible, multi-component mixture of a bio-oil, a biodiesel fuel, and a petroleum diesel fuel.

BRIEF DESCRIPTION OF THE DRAWINGS

Many aspects of this disclosure can be better understood with reference to the following drawings. The components in the drawings are not necessarily to scale. Moreover, in the drawings, like reference numerals designate corresponding parts throughout the several views.

DETAILED DESCRIPTION

Figure 1:
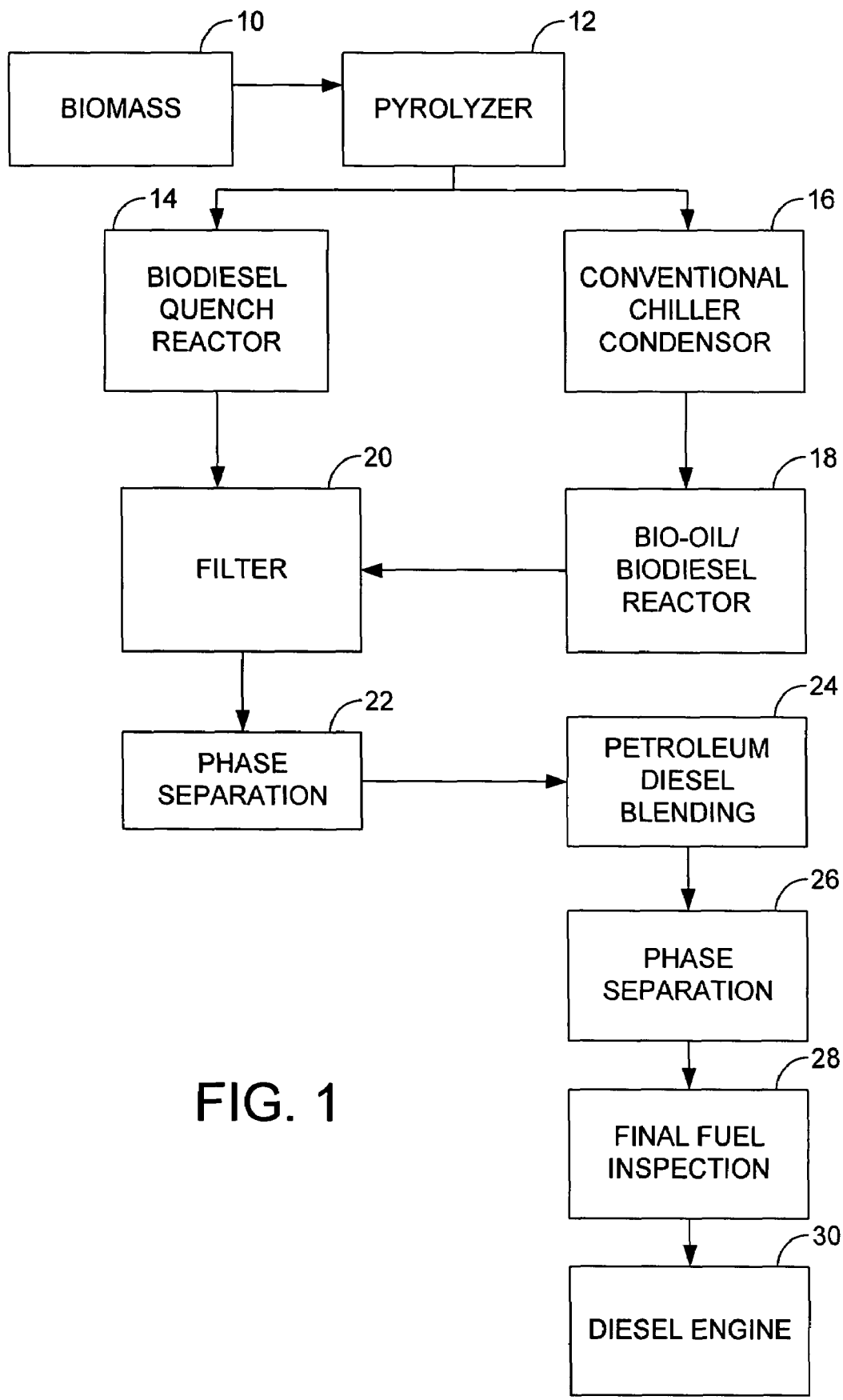
FIG. 1 illustrates an embodiment of a representative process of the present disclosure.

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, organic chemistry, oil chemistry, biology, physics, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Definitions:

In this specification and in the claims that follow, reference will be made to a number of terms that shall be defined to have the following meanings unless a contrary intention is apparent.

"Biomass" can be created as products, by-products, and/or residues of the forestry and agriculture industries. Biomass includes, but is not limited to, plants, trees, crops, crop residues, grasses, forest and mill residues, wood and wood wastes, fast-growing trees, and combinations thereof. In particular, biomass can include cellulose, fatty acids, triglycerides, hemicelluose, and/or lignin. The trees include, but are not limited to, pine trees and pine tree by-products and other tree or plant material (biomass) containing cellulose, lignin and hemicellulose.

"Pyrolysis" is the thermal conversion of biomass in the absence of oxygen at temperatures generally about 350 to 700° C. When treated at these temperatures, biomass decomposes and, after cooling, three primary products are created, namely, charcoal, bio-oil, and gases (e.g., CO, $H_2$, $CO_2$, and $CH_4$).

As used herein, crude "bio-oil" is a mixture of water and organic chemicals and is highly reactive because of the presence of significant quantities of oxygen. At temperatures around 450° C. the bio-oil is a complex mixture of chemical species that result primarily from the decomposition of cellulose, fatty acids, triglycerides, hemicellulose, and lignin. There are over 300 compounds identified that include, but are not limited to, hydroxyaldehydes, hydroxyketones, sugars, carboxylic acids, and phenolics. The abundance of these chemical species in bio-oil makes it similar to crude petroleum oil, and thus an attractive resource for obtaining chemicals and fuels.

As used herein, "biodiesel" is a mixture of mono-alkyl esters of fatty acids.

As used herein, "petroleum diesel" is any fuel meeting the ASTM D975 specification.

General Discussion

Miscible, multi-component diesel fuels, bio-oil/biodiesel fuel mixtures, and methods of bio-oil transformation are described herein. In general, a pyrolysis system can be used to create bio-oil products in a biomass pyrolysis conversion and subsequently capture the bio-oil products during a condensation process. The bio-oil is treated and then mixed with a biodiesel fuel and treated (e.g., fractionated and/or dewatered). Subsequently, the treated mixture is mixed with a petroleum based diesel fuel to produce a miscible, multi-component diesel fuel. Embodiments of the present disclosure can be used to produce a substitute diesel fuel and/or an extender for petroleum diesel fuel.

Embodiments of the present disclosure include the deactivation of unstable bio-oil components, the removal of water from the bio-oil mixture, and recovery of fuel grade compounds from bio-oil. Diesel engine tests of substitute diesel (bio-oil/biodiesel) and petroleum diesel extender (a miscible, multi-component diesel fuel) for 45 min. periods showed no observable difference in exhaust smoke, ignition noise, or output power, compared to commercial petroleum diesel.

Embodiments of the present disclosure provide bio-oil and a liquid biodiesel fuel mixture (miscible, multi-component diesel fuel) for diesel engines and other combustion equipment. Embodiments of the present disclosure provide refining processes for obtaining fuel-quality chemical compounds from pyrolytic vapors or pyrolytic liquids obtained from condensed pyrolytic vapors (bio-oil) obtained from the pyrolysis of biomass containing organic materials that most commonly include lignin and cellulose or lignin or cellulose alone. The bio-oil is composed of organic fuel-quality chemical compounds originating from biomass, especially plant biomass containing lignin and cellulose that is extracted by and mixed with biodiesel. In other words, the compounds from biomass can be obtained by extracting biomass pyrolytic vapors, either in condensed liquid phase or in vapor phase, and using liquid biodiesel as a solvent extractant. The bio-oil/biodiesel fuel extractant can be included as a fuel component of the final prepared fuel. The extracted bio-oil/biodiesel fuel (referred to as "bio-diesel fuel") may be used alone or in a mixture with petroleum diesel fuels as a miscible, multi-component, diesel fuel.

Figure 2:
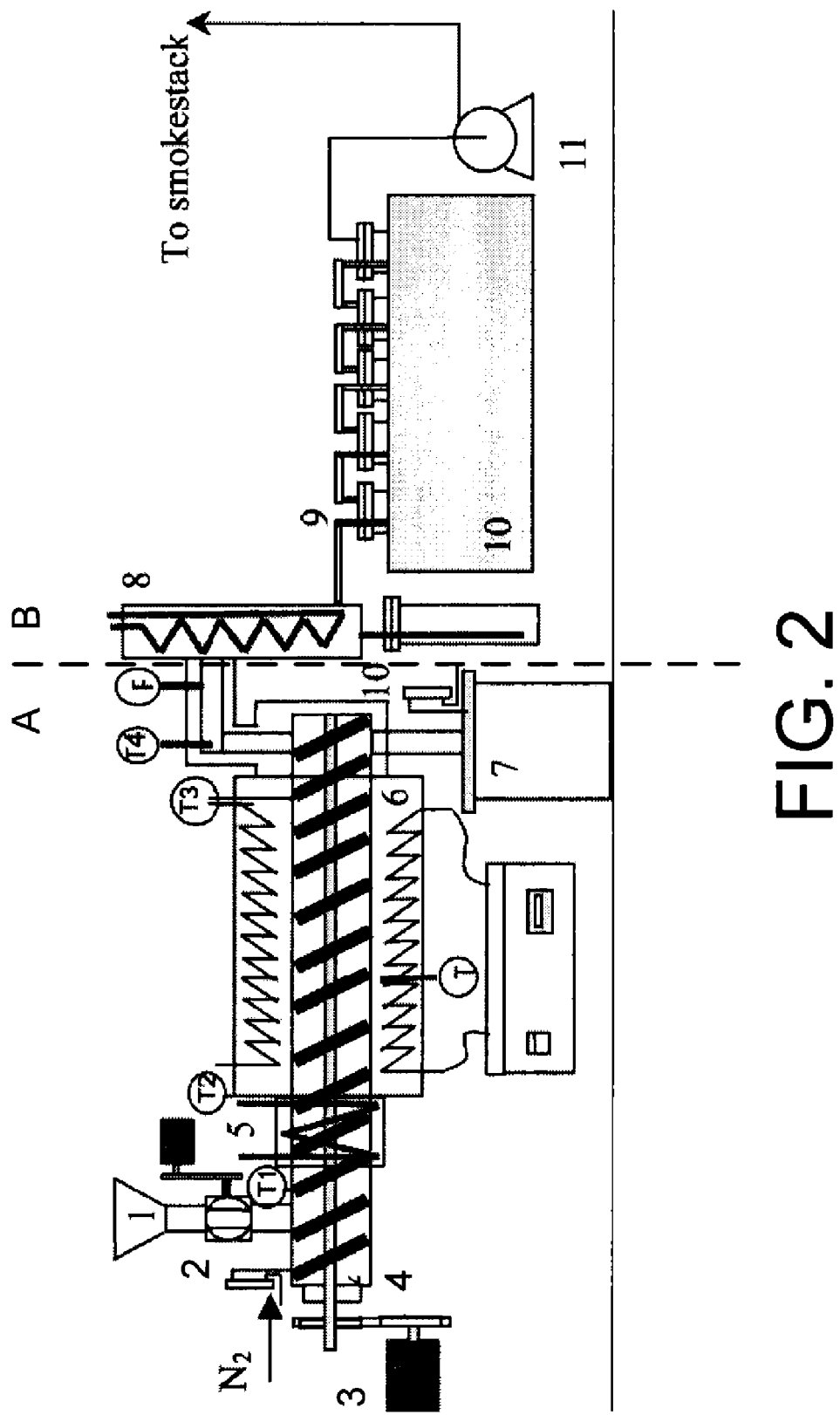
FIG. 2 illustrates a continuous pyrolysis reactor used in the conversion of biomass to produce bio-oil and bio-oil/biodiesel fuels.

FIG. 1 illustrates an illustrative embodiment of the process of the present disclosure, while FIG. 2 illustrates a continuous pyrolysis reactor used in the conversion of biomass to produce bio-oil and bio-oil/biodiesel fuels. In part A of FIG. 2, left of the dashed line, a typical auger type biomass pyrolyzer is depicted. In part B of FIG. 2, right of the dashed line, an embodiment of the bio-oil/biodiesel production unit is depicted. The continuous pyrolysis reactor includes, but it not limited to, (1) feeding hopper, (2) feeding valve, (3) auger motor, (4) auger conveyer, (5) cooler, (6) heater, (7) char container, (8) water cooler, (9) bio-oil traps, (10) ice chiller, and (11) vacuum pump. Embodiments of the present disclosure can be implemented using the continuous pyrolysis reactor illustrated in FIG. 2.

In general, a biomass (block 10) is added to a pyrolysis reactor (also referred to as a "pyrolyzer") (block 12) and a bio-oil vapor is formed. The pyrolysis reactor is a chamber in which the biomass raw materials are heated to the point at which biomass polymers begin to decompose and chemical conversion of the biomass occurs. The process generally involves heating in an inert (in the absence of oxygen) atmosphere (e.g., nitrogen, helium, argon, and the like) to prevent combustion. As the biomass is heated (e.g., in a pre-determined heating ramp of about 2 to 100° C./min for slow pyrolysis reactors and over 1000° C./min for fast pyrolysis reactors) and held in a predetermined temperature range (from about 350 to 700° C.) for a specified time frame (e.g., from 6 to 50 seconds in fast pyrolysis, from a few minutes in an Auger reactor to days in slow pyrolysis industrial kilns), the material is broken down into simpler components that are given off as bio-oil vapors (e.g., one or more compounds). In an embodiment, the pressure, the temperature, and/or the time frame can be adjusted in many combinations based, at least in part, upon the biomass, the make-up of the bio-oil desired, and the like.

The bio-oil vapor is held at an elevated temperature (from about 350 to 700° C.) for less than about 20 s, at about ambient pressure, while the solids inside the reactor are held at an elevated temperature for about 6 seconds to 10 minutes. Also, there are fast and slow pyrolysis methods and embodiments of the present disclosure apply to each of these processes using a wide range of process variables.

The pyrolysis reactor is interfaced with a collection system. The bio-oil vapor stream produced in the pyrolysis reactor is transferred to the collection system and collected. One skilled in the art understands pyrolysis systems and how they operate, so additional details are not disclosed here. One reference that further describes pyrolysis is: Boucher (1977), *Pyrolysis of industrial wastes for oil and activated carbon recovery*. Environmental Protection Agency Office of Research and Development Industrial Environmental Research Laboratory, which is incorporated herein by reference.

The slow pyrolysis reactors lead to the formation of more charcoal and less oils. The range of conditions used for bio-oil production is very diverse but the pyrolysis to produce bio-oils is generally conducted under the following conditions. The particle diameters present are about 0.05 to 10 cm, while the smaller particle sizes lead to the production of bio-oils with less water, but in general has little effect on the overall yield of resulting phases. The temperatures are usually about 350 to 700° C. In an embodiment, the maximum yield of liquid is obtained at temperatures of about 450 to 550° C. Vapour residence times in the reactor are about 0.1 to 20 s. In an embodiment, the maximum yield of bio-oils are obtained at the lower residence times. The solid residence time in the reactor can vary from a few seconds to hours depending on the type of reactor used.

Some of the possible reactors include, but are not limited to: fixed bed, moving bed, auger, fluidized and circulating bed reactors. In an embodiment, the maximum yield of liquids has been for fluidized bed reactors. The fluidized bed reactors can operate with different carrier gases: nitrogen, combustion gases, steam, hydrogen, and combinations thereof, at pressures in the deep vacuum range (about 10 kPa to 5 atm). In an embodiment, lower pressures tend to form more bio-oils.

In an embodiment, the bio-oil vapor stream is condensed using a biodiesel fuel (e.g., ASTM 6751 specification biodiesel) (block 14) to a desired concentration. The bio-oil vapor is quenched when mixing with the biodiesel fuel. The concentration of the bio-oil in biodiesel fuel is about 5 to 75, 25 to 75, 5 to 40, and 25 to 40 mass %. In an embodiment, higher concentrations of bio-oil extractives in the biodiesel may be achieved. The achieved concentration depends on the condensation temperature used and the ratio of biodiesel to pyrolysis vapors used. The lower and higher molecular weight bio-oil phase can be separated and/or further treated using methanol (use about 5% methanol w/w) to decrease the reactivity and stabilize these bio-oil phases. In an embodiment, the lower molecular weight bio-oil phase can be mixed with the biodiesel.

Alternatively, the bio-oil from the pyrolysis reactor can condense by a traditional indirect condensation system (about 0 to 25° C.) (block 16) into an aqueous phase and an oily phase (e.g., many fast pyrolysis technologies are only likely to generate an unique oily phase). Then a process for separating the aqueous phase and the oily phase may be performed. The content of water in the aqueous phase can be reduced by heating (about 50 to 70° C.) under negative manometric pressure (−21 kPa). The lower and higher molecular weight bio-oil phase can be separated and/or further treated using methanol (use about 5% methanol w/w) to decrease the reactivity and stabilize these bio-oil phases. In an embodiment, the lower molecular weight bio-oil phase can be mixed with the biodiesel.

Condensed whole bio-oil or fractionated and treated phases (e.g., the lower molecular weight bio-oil/biodiesel phase) from either the quenching (with biodiesel fuel) and/or chilling processes (indirect condensation) are then mixed with biodiesel (block 14 or 18) at the desired mass ratio and then filtered (e.g., a ceramic filter) to remove any charcoal particles that might be present (block 20). After filtration, any heavy non-miscible fluid can be separated from the mixture (block 22).

The resultant fluid (hereinafter "bio-oil/biodiesel mixture") can be mixed with a petroleum diesel fuel (block 24). The bio-oil/biodiesel mixture and the petroleum diesel fuel can be mixed to a desired concentration (e.g., about 20% (mass/mass) (+/−5, 10, 15, and 20%) bio-oil/biodiesel mixture and 80% (+/−5, 10, 15, and 20%) petroleum diesel fuel or even a higher concentration of bio-oil/biodiesel mixture relative to the petroleum diesel fuel). After standing, any additional heavy non-miscible fluid is separated from the multi-component, diesel fuel mixture (blocks 26-30).

Embodiments of the bio-oil/biodiesel and the miscible, multi-component, diesel fuel mixture illustrate that the mixture can be used in diesel engines (additional results are shown in Example 1 below). The miscible, multi-component, diesel fuel mixture powered a diesel engine without degradation of performance or power. Operation of the diesel engine with the miscible, multi-component, diesel fuel mixture was sustained and the diesel engine operated smoothly with out interruption. An electric generator was driven by the engine and the generator did not experience loss of power. In addition, visible emissions from the diesel engine with the mixture were less than the emissions with petroleum diesel alone.

EXAMPLES

Now having described the embodiments of the biodiesel fuels and methods of bio-oil transformation, in general, example 1 describes some additional embodiments of the biodiesel fuels and methods of bio-oil transformation. While embodiments of biodiesel fuels and methods of bio-oil transformation are described in connection with example 1 and the corresponding text and figures, there is no intent to limit embodiments of the miscible, multi-component, diesel fuels and methods of bio-oil transformation to these descriptions. On the contrary, the intent is to cover all alternatives, modifications, and equivalents included within the spirit and scope of embodiments of the present disclosure.

Example 1

Sustained operation of a single cylinder direct injection diesel engine was conducted using the mixtures (e.g., miscible, multi-component, diesel fuel (20% bio-oil/biodiesel and 80% diesel fuel) and bio-oil/biodiesel fuel mixture (1:2)) described herein. The engine was outfitted with a dual fuel system and ignition was achieved while using #2 petroleum diesel as a startup fuel. After a 10 minute warm-up at half rated engine power, fueling was switched to mixtures of bio-oil, biodiesel and petroleum diesel samples. Engine performance was smooth and continued without interruption with bio-oil/biodiesel mixtures as well as these mixtures with petroleum diesel. The engine was operated for 30 minutes without interruption. The engine drove an electric generator that experienced no loss in power from the switch in fuels. Visible emissions from the engine were low in particulate matter compared to petroleum diesel alone.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±6%, ±7%, ±8%, ±9%, or ±10%, or more of the numerical value(s) being modified. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

We claim:

1. A method of recovering a bio-oil product, comprising:
providing a biomass, wherein the biomass is made up of material selected from the group consisting of: cellulose, hemicellulose, and lignin, and wherein the biomass is selected from the group consisting of: a plant, a tree, a crop, a crop residue, grass, forest and mill residue, wood and wood waste, and a combination thereof;
heating the biomass to about 350 to 700° C. at about ambient pressure for about 6 seconds to 10 minutes;
producing a bio-oil, wherein the bio-oil is a bio-oil vapor stream;
mixing the bio-oil with a biodiesel fuel to form a bio-oil/biodiesel fuel mixture, wherein the biodiesel fuel contains a mixture of mono-alkyl esters of fatty acids.

2. The method of claim 1, wherein mixing includes:
mixing the bio-oil/biodiesel fuel mixture with a petroleum diesel fuel to produce a miscible, multi-component diesel fuel mixture.

3. The method of claim 1, wherein the bio-oil/biodiesel fuel mixture is about 20% of the miscible, multi-component diesel fuel mixture, and the petroleum diesel fuel is about 80% of the miscible, multi-component diesel fuel mixture.

4. The method of claim 1, wherein the bio-oil includes a lower molecular weight bio-oil/biodiesel fuel phase and a higher molecular weight bio-oil/biodiesel fuel phase.

5. The method of claim 4, further comprises:
separating the lower molecular weight bio-oil/biodiesel fuel phase from the higher molecular weight bio-oil/biodiesel fuel phase.

6. The method of claim 5, wherein mixing includes:
mixing the lower molecular weight bio-oil/biodiesel fuel phase with a petroleum diesel fuel to produce a miscible, multi-component diesel fuel mixture.

7. The method of claim 1, wherein the bio-oil is about 5 to 75 mass % of the bio-oil/biodiesel fuel mixture.

8. The method of claim 1, wherein producing comprises:
forming the fuel from bio-oil in the vapor phase using a technique for selecting usable fuel compounds, wherein the technique includes direct condensation by contacting the bio-oil vapor with liquid bio-diesel, the biodiesel, the petroleum diesel fuel, and a combination thereof.

9. The method of claim 1, wherein heating comprises:
heating the biomass using a heating ramp of about 2 to 100° C./min.

10. The method of claim 1, wherein heating comprises:
heating the biomass using a heating ramp of about 2 to 1000° C./min.

11. A multi-component diesel fuel comprising:
a mixture of a bio-oil, a biodiesel fuel, and a petroleum diesel fuel, wherein the biodiesel fuel contains a mixture of mono-alkyl esters of fatty acids and the bio-oil is derived from biomass, wherein the biomass is made up of material selected from the group consisting of: cellulose, hemicellulose, and lignin, and wherein the biomass is selected from the group consisting of a plant, a tree, a crop, a crop residue, grass, forest and mill residue, wood and wood waste, and a combination thereof.

12. The diesel fuel of claim of 11, wherein the fuel is entirely miscible.

13. The diesel fuel of claim of 11, wherein the bio-oil acts as an antioxidant in the multi-component, diesel fuel.

14. The diesel fuel of claim of 11, wherein the bio-oil has the characteristic of improving the cold-flow properties of the diesel fuel.

* * * * *